United States Patent [19]

Derby et al.

[11] 4,079,591

[45] Mar. 21, 1978

[54] SOLAR POWER PLANT

[76] Inventors: Ronald C. Derby, 11162 Wickford Dr., Santa Ana, Calif. 92705; Stanley H. Zelinger, 14411 Heights Dr., Tustin, Calif. 92680; William P. Dampier, 525 Comanche Dr., Placentia, Calif. 92670; Samuel P. Lazzara, 12002 Cherry St., Los Alamitos, Calif. 90720

[21] Appl. No.: 710,569

[22] Filed: Aug. 2, 1976

[51] Int. Cl.² ............................................. F03G 7/02
[52] U.S. Cl. ........................................ 60/641; 60/659; 126/271; 290/1 R; 290/40 B
[58] Field of Search ................ 60/514, 641, 649, 652, 60/659, 671; 126/270, 271; 290/1, 40 B, 52

[56] References Cited
U.S. PATENT DOCUMENTS

| | | | |
|---|---|---|---|
| 2,942,411 | 6/1960 | Hutchings | 60/641 |
| 3,597,621 | 8/1971 | Yamada | 60/652 |
| 3,977,197 | 8/1976 | Brantley | 60/659 |

*Primary Examiner*—Allen M. Ostrager
*Assistant Examiner*—Stephen F. Husar

[57] ABSTRACT

The specification discloses a Solar Power Plant which utilizes a sun-tracking parabolic collector and a plurality of energy storage and conversion devices, all of which are operated under the control of a novel energy management system. Allocation of energy to a particular storage component or to useful output is dependent upon the state of the system as well as the nature of the demand. Outputted energy may also be recaptured and reallocated to minimize losses. Efficiency at the component level is enhanced by the utilization of novel heat exchangers which effectuate complete conversion of the operating liquid to superheated gas.

6 Claims, 9 Drawing Figures

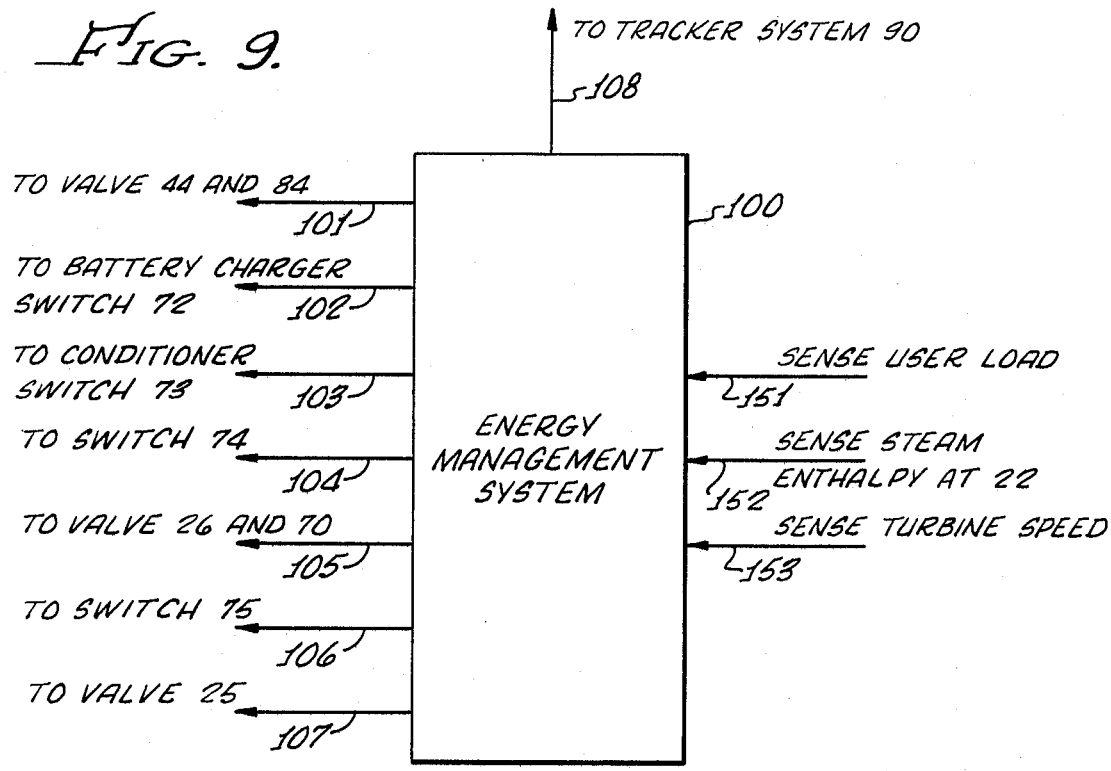
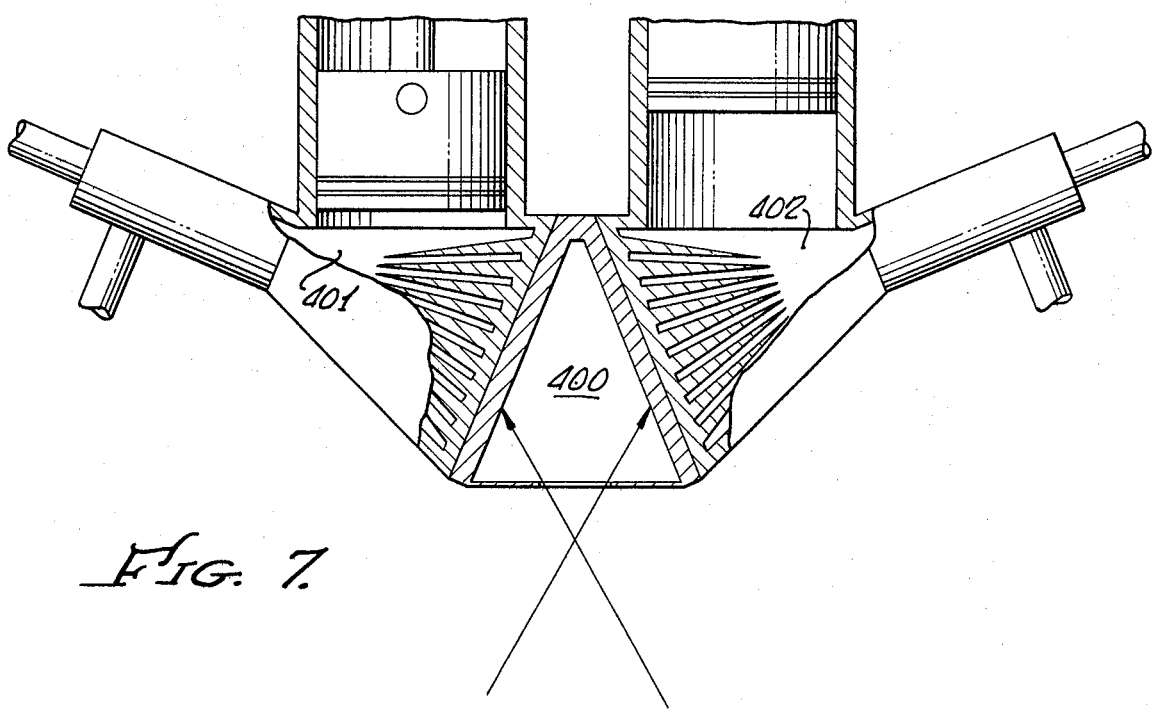

SOLAR POWER PLANT

BACKGROUND OF THE INVENTION

The future of many countries will be strongly influenced by their capability of meeting increased energy demands. Historically fossil fuels have been the primary source for heating, lighting and operating industrial machinery. Such fuels however, have become expensive, and current estimates indicate that U.S. oil and gas outputs will be negligible by the year 2020. Even now, the prospect of supplying fossil fuels to remote hamlets in underdeveloped countries is economically unfeasible. In such countries, it is essential that self-sufficient energy sources be developed. In most cases, this means direct conversion of solar energy to electricity and heat.

The sun's radient energy however, is more difficult to utilize than fossil fuels because it is of relatively low intensity and, of course, it is not always present. On a clear day, an area of 150 $m^2$ will receive an average of 126,000 BTU's/hr averaged over 24 hours. The problem however, is in collecting this energy, converting it to a highly available form, storing it for times of no sunlight, and using it when demanded.

There are two basic types of collectors, flat plate and concentrating. Flat plate collectors are usually a rectangular sheet of copper, aluminum or steel, which conducts heat easily. The plate is normally coated with a dark substance, such as black paint, which may absorb as much as 95% of the incident radiation. Much of the energy which is absorbed however, is then emitted as long wave heat radiation — which reduces the temperature of the plate and consequently the theoretical thermodynamic efficiency — which is directly dependent upon the difference between the plate and ambient temperatures. Concentrating collectors (such as parabolic mirrors) on the other hand, produce much higher temperature by focusing the sun's rays on a small area where an operating fluid is injected. As a consequence, such devices are capable of higher theoretical efficiencies. In prior art devices however, this theoretical advantage was largely overshadowed by inefficiencies in the energy storage and management system. In addition, such devices are traditionally costly to produce, and normally require complex equipment for tracking the earth's rotation.

What is actually desired is an efficient energy storage, conversion and management system which can be used in conjunction with a parabolic, sun-tracking reflector to provide electricity and heat to isolated population areas.

Accordingly, a primary objective of the present invention is to provide an efficient system for collecting, converting, and storing energy derived from sunlight.

A further object of the present invention is to provide a sun tracking concentrator for focusing solar energy upon a heat exchanger.

Another object of the invention is to provide a heat exchanger for converting a fluid to vapor in a flash process.

Another object of the invention is to provide a system for storing converted solar energy in the form of compressed gas for subsequent use in a gas turbine.

Another object of the invention is to provide a means for storing excess solar energy in the form of heat.

Another object of the invention is to provide a means for utilizing solar energy which is stored in the form of heat to raise the temperature of a gas which has been previously compressed for the purpose of operating a gas turbine.

A further object of the invention is to provide an auxilliary battery system for storing small amounts of energy for specific purposes which do not require heavy discharge rates for extended periods.

Another object of the invention is to provide an energy management system which can automatically adjust, priorities and allocate the tasks of various energy storage and conversion components.

Another object of the invention is to provide a logic system which will automatically locate and track the sun each day.

It is yet another object of the invention to provide a heat exchanger for trapping and collecting the focused rays of a solar concentrator.

Another object of the invention is to provide a flash vaporizor piston engine.

Other objects and advantages of the invention will be obvious from the detailed description of a preferred embodiment given herein below.

SUMMARY OF THE INVENTION

The aforementioned objects are realized by a sun tracking collector which concentrates the sun's rays on a unique heat exchanger which flash converts an injected fluid to superheated vapor. The superheated vapor is converted to useful energy in various ways, depending upon the system conditions. Thus, it may be directed to a gas turbine which in turn drives compressors and generators which store the energy for later consumption, or it may be routed to a hot well and/or heat exchanger to provide a thermal source for preheating injected fluid as well as gas which has been previously compressed to operate the turbine at times when the load requirement exceed that which can be developed by the Solar Collector. Complete conversion of the fluid to a superheated vapor is effectuated by a multiple pyramidal surface which subjects the injected fluid to a plurality of reflections. In one embodiment of the invention, two such heat exchangers are positioned to form the head chambers of a two cylinder reciprocating piston steam engine in lieu of the gas turbine referred to above.

DESCRIPTION OF THE DRAWINGS

FIG. 7 shows a cross-sectional view of a reciprocating piston engine in which the head cavities comprise multiple pyramidal heat exchangers.

FIG. 9 shows a block diagram representation of the inputs and outputs of the energy management system.

DETAILED DESCRIPTION OF A PREFERRED EMBODIMENT

Figure 1:
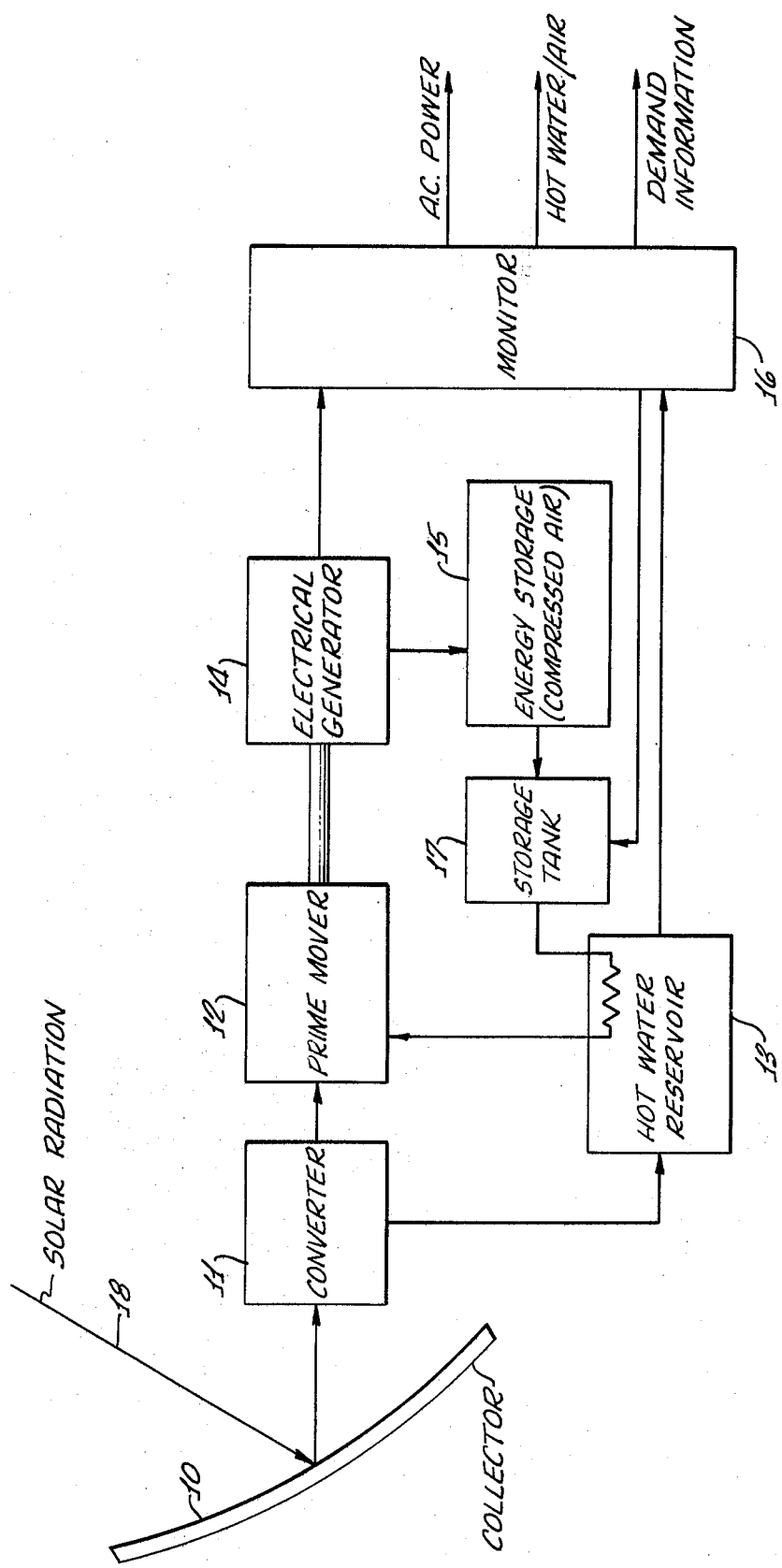
FIG. 1 shows a simplified block diagram of the basic components comprising the Solar Power Plant.

Adverting to the drawings, and particularly FIG. 1, a simple form of the power plant comprises the basic elements of a parabolic reflector 10 which concentrates the solar energy 18 into a converter 11 in which a fluid is vaporized to a superheated gas for operating a prime mover 12, or raising the temperature of hot water reservoir 13. The output of the prime mover 12 is used to drive an electrical generator 14 which in turn supplies energy to a compressor 15. The generator 14 and the hot water reservoir 13 also output their respective forms of energy directly to the user depending upon the demand requirements sensed by monitor 16. Energy stored in the form of compressed gas in storage tank 17 is utilized to operate prime mover 12 when the demand for electrical energy exceeds that which can be supplied by conversion of the incident radiation 18.

Figure 2:
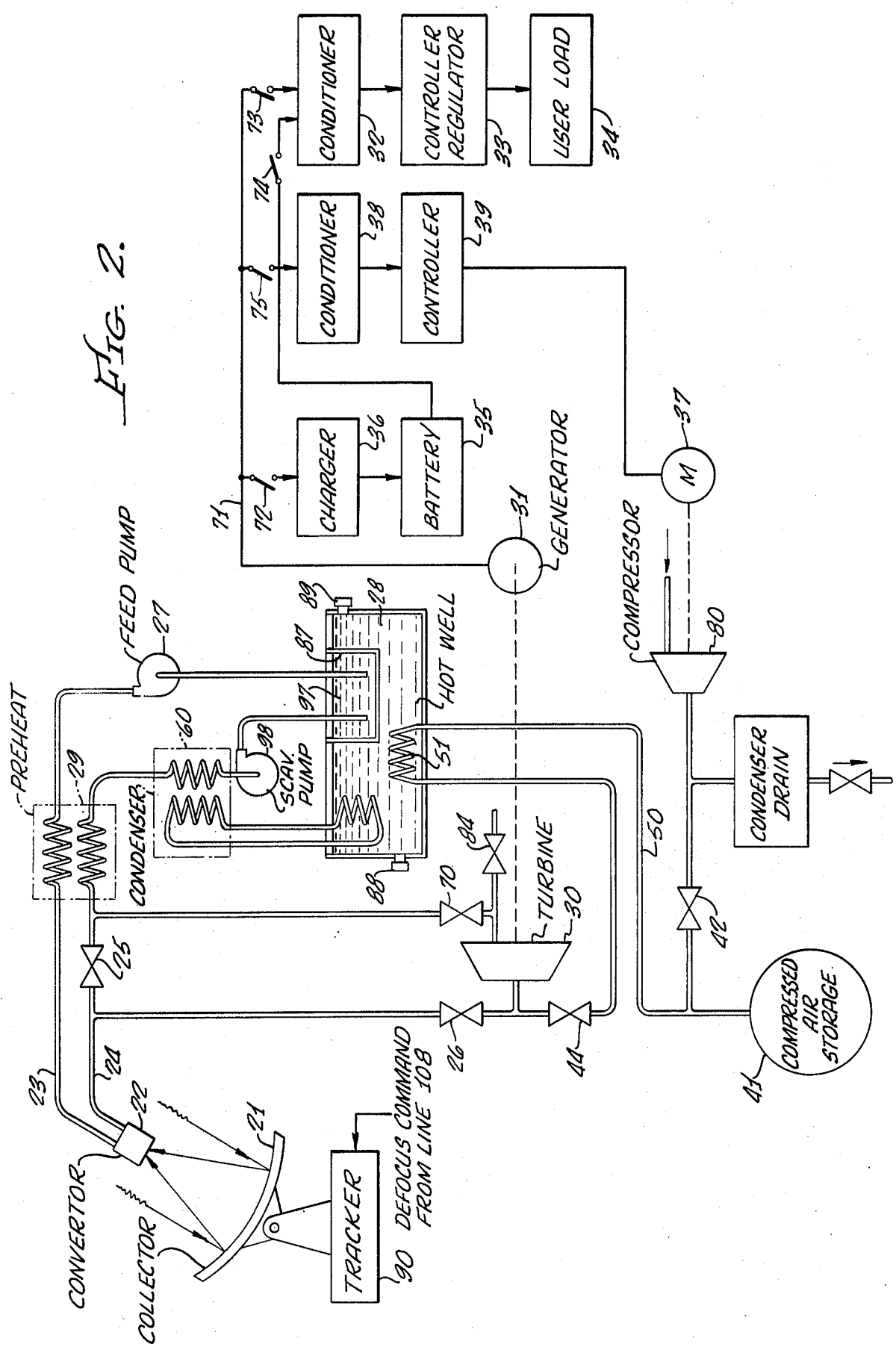
FIG. 2 shows a diagrammatical representation of a preferred embodiment of the invention.

FIG. 2 shows a preferred embodiment of the system configuration, including the various diagrammatical interconnections for optimizing overall operating efficiency. Mirror 21 is preferably a parabolic reflector having an overall diameter of approximately 6 meters. The mirror is gimbaled on a structure which utilizes an azimuth and elevation mount, thus facilitating convenient installation without dependence upon precise astrophysical orientation. The solar rays are focused on a small area of an entraping converter 22 (the details of which are discussed herein below). Operating fluid (preferably water) injected into the converter 22 through line 23 exits in the form of high pressure gas through line 24. Where water is used as fluid, it has been found desirable that the water to steam conversion be totally complete (superheated steam exit temperature in the range of 600° F at pressures of approximately 350 psi). The efficiency of the conversion process in converter 22 is aided by the high enthalpy of the injected fluid. The fluid is drawn from feed water reservoir 97 and then passed through heat exchanger 29 to further augment the temperature of the fluid at the port of injection into converter 22. Valves 25 and 26 operate under the control of the energy management system to determine the first energy allocation to be made. When the valve 26 is opened, the superheated gas enters the turbine which delivers shaft power to drive the generator 31. Generator 31 generates electrical power for several independent uses. Thus, it may deliver power directly to a load 34 via the conditioner 32 and controller regulator 33. This situation would exist for example, when a consumer demands power at a time when the collector 21 is able to focus enough thermal energy on the heat exchanger to meet the demand. The generator 31 (or alternator as the case may be) also generates electricity via charge 36 to keep the batteries 35 fully energized. In addition, the electrical output of the generator 31 is used to drive compressor motor 37 via conditioner 38 and controller 39. This condition will exist at any time when the amount of electrical power supplied by generator 31 exceeds that taken by charger 36 and that which is demanded by the consumer load 34. The result therefore, is that residual electrical energy output from generator 31 is stored in the form of compressed gas in tank 41. It will be understood at this point that the state of the valves 42 and 44 are dependent upon commands provided by the energy management controller to be described below.

It is contemplated that a storage capacity of 66 KWH would be adequate for many isolated hamlets. This can be achieved using 74 cubic ft. (37 bottles of 2 cubic ft. each) of storage at 5000 psi. An important advantage of this type of energy storage lies in the longevity of the components. In the more conventional forms of energy storage (such as batteries) the charging and discharging cycles degrade component performance. This is particularly true where power is drawn continuously over a long period of time (e.g., during the hours after sunset and before sunrise), so that the battery charge is totally or near totally depleted.*The present system employs instead, a number of compressed air tanks which can be cycled and recycled indefinitely. An important consideration in adopting such an energy storage system lies in the fact that in conventional compressed gas systems, energy is lost in the compression and expansion process. This loss is due to the fact that the process is not adiabatic (that is, the system is not thermally insulated from its surroundings so that heat is allowed to escape to the environment). As a consequence, the heat gained by the gas during compression is lost by thermal conductivity to the environment, thus reducing the temperature of the exhausting gas below that of the ambient. Consequently, the energy available for useful work to operate the turbine 30 is less.

*(It has been calculated that a collector having an area of 27 $M^2$ and a concentration ratio of 5000:1 can provide approximately 10 KW of electrical power and 33,500 BTU's/hr. heat under average daylight conditions with due allowance being given to the efficiencies of all devices. The daily output is estimated to be 100 KW-Hrs. of electricity, and 335,000 B.T.U.'s of thermal energy, with maintenance free operation for 10 years.)

The present invention takes advantage of the component longevity which can be realized using compressed gas storage without materially reducing the overall system efficiency which could be achieved using conventional electric storage batteries. This is accomplished by routing (line 50) the exhausting gas from the compressed air storage tanks 41 through the hot well 28 in order to pick up additional thermal energy for operating the turbine 30 via valve 44. Hn essence, the heat gained during pressurization and subsequently lost through conductivity to the surroundings during storage is partially compensated for by the heat which is reintroduced as the gas passes through heat exchanger 51.

Figure 3:
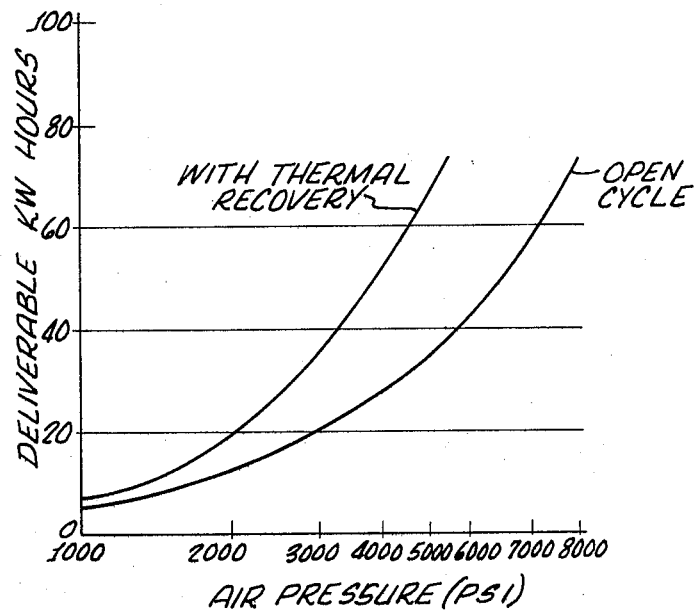
FIG. 3 shows a graph illustrating the relationship between the compressed air storage energy as a function of pressure for open cycle and for thermal recovery.

FIG. 3 shows a graph illustrating the relationship as a function of air pressure with and without thermal recovery. In the area of 5000 psi the deliverable energy is increased approximately 25 KWH (65 KWH at 5000 psi with thermal recovery - 30 KWH at 5000 psi without thermal recovery). This corresponds to an overall increase in the efficiency of the energy storage system in excess of 100%.

Heat energy for maintaining the temperature of the hot well 28 is derived from the latent heat of the condensing steam via condensor 60.* The hot well 28 is thermally insulated so as to minimize the energy which is lost to the environment through conduction. The hot well 28 thus serves the multiple function of [1] a heat reservoir for maintaining the operating fluid in 97 at an elevated temperature to reduce the amount of energy required to effect complete conversion by converter 22, and [2] as a heat reservoir for raising the temperature of the exhausting gas supplied to the turbine 30 via compressed air storage 41. In addition, the hot well 28 may be connected so as to supply hot water directly to a user (e.g., capped line 89). A cold water input connection may be made directly to the hot well (e.g., capped line 88). If the operating fluid in tank 97 is not water, tank 97 must be separate as indicated by the partition 87).

* (A thermal sink for condensor 60 is provided by the hot well 28. Scavenger pump 98 provides a vacuum to reduce the pressure into which the turbine 30 exhausts, and lifts the condensed fluid to atmospheric pressure in tank 97.)

Figure 8:
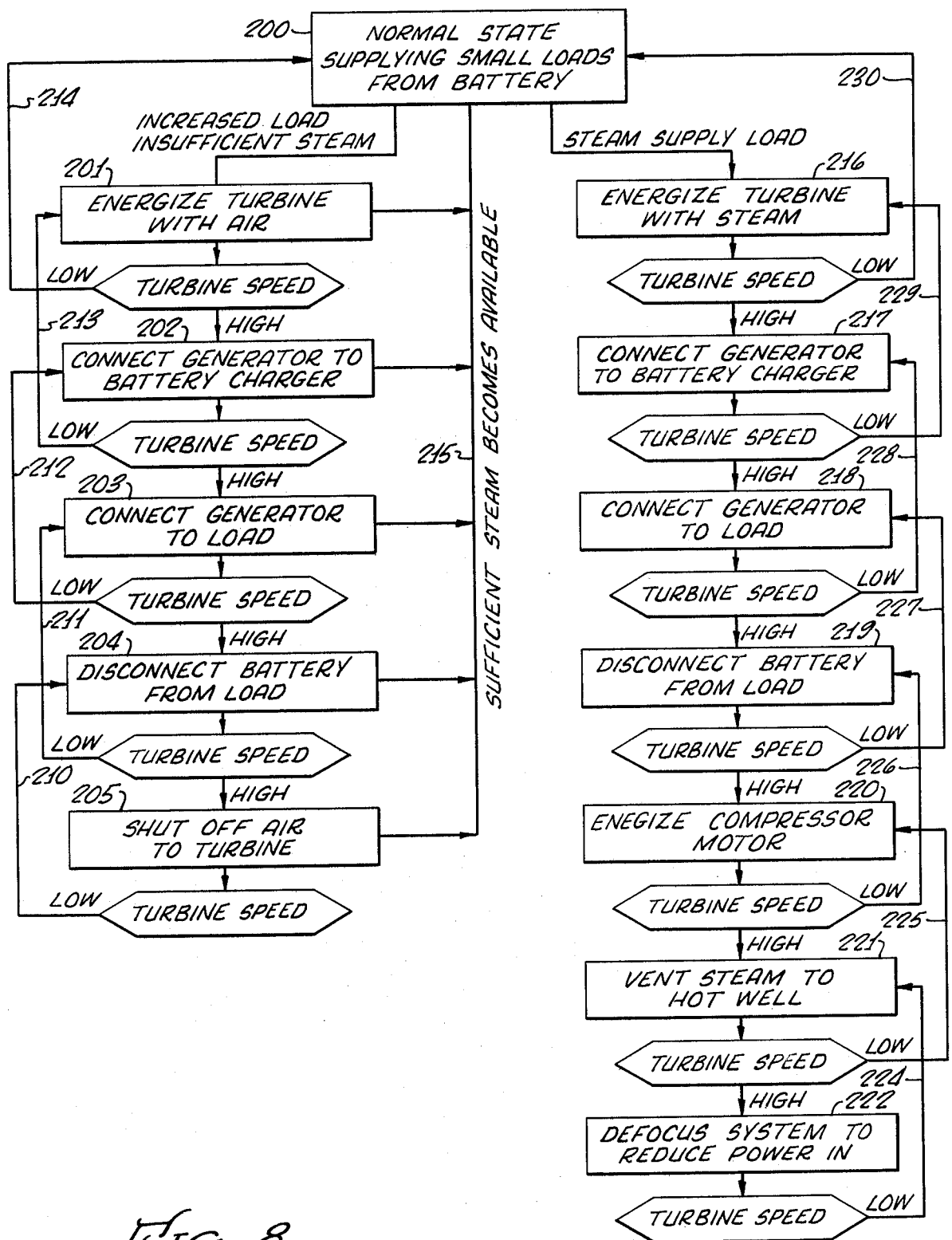
FIG. 8 shows an energy management flow chart.

FIG. 8 shows a power management flow chart diagram which depicts the state of the various operative elements shown in FIG. 2 as a function of the solar input and the quantity and duration of the user demand. The mechanism by which the various electrical and mechanical components are actuated in response to the logical states shown in FIG. 2 is typically a solenoid, although it is understood that any electromechanical, pneumatic or hydraulic device could be used for this purpose. It is further understood that the apparatus used for sensing pressures, duration times, rates of discharge and other values, are all prior art components, having outputs capable of being converted into electrical signals by conventional transducers. The details of these components as well as the actuating elements for controlling the valves, motors and other devices have thus been eliminated for the sake of simplicity.

Referring now to FIGS. 2, 8 and 9, the Energy Management System 100 generates electrical commands (on lines 101-107) to operate the components in accordance with the states shown in FIG. 8 - which in turn are dependent upon the inputs (lines 151-153). As mentioned hereinabove, these inputs (151-153) are generates by transducers which convert the physical quantity (pressure, temperature, time, flow rate, etc.) into an electrical signal which can be utilized by the Energy Management System 100.

The energy management system 100 is typically a special purpose computer. When the user demand is low, and there is insufficient steam being generated by the sun (e.g., night or inclement weather as sensed by input 152) the system will assume the state identified by the numeral 200, in which case the user draws power directly from the battery. If the consumer load increases (as sensed by input line 151) and the steam enthalpy is still insufficient to supply the user demand, the system will change to state 201. When this occurs, a command is generated on line 101 which causes valves 44 and 84 to open, thus operating turbine 30 from the compressed air storage 41. (It is assumed that the valves 26, 25 and 70 have been previously closed and the poppet valve 42 is closed because the pressure in storage 41 exceeds the pressure in line 43).

If the energy output from the turbine is greater than the user demand (turbine speed high as sensed on line 153) the generator 31 (or alternator as the case may be) is connected via switch 72 by a command on line 102 (as indicated in the state labeled 202) so that excess energy can be used to charge battery 35. If the turbine speed as sensed on line 153 is still higher than a predetermined angular velocity, the output of the generator 31 (line 71) is connected to the load via switch 73 as indicated by the state labelled 203. If the speed of the turbine 30 is still higher than a predetermined minimum, the battery 35 will be automatically disconnected from the load 34 via a command to switch 74 on line 104 as indicated by the state labelled 204. State 205 is reached only when the turbine 30 runs in excess of a predetermined minimum speed (sensed on line 153) - while supplying all power demanded by the load 34 and the charger 36.

An increase in the load demand causes the energy management system to revert to the next highest state as indicated by the paths 210-215. Thus, whenever there is insufficient steam being generated and the turbine speed drops below a predetermined minimum, (as sensed on line 153), the energy management system 100 automatically reduces the load requirement. If the turbine speed does not increase sufficiently, a further reduction in load occurs, etc., until the system eventually reverts to state 200. A reversion to state 200 may also occur as a result of an increase in the amount of steam being generated. This condition is illustrated by the path 215.

States 216-219 are analogous to the corresponding states 201-204 which are arrived at by energizing the turbine 30 from the compressed air source 41. In the case where there is sufficient steam energy being generated by the sun (sensed by line 152) the valves 44 and 84 will be closed by a command on line 101, and the valves 26, and 70 will be opened by a command on line 105, thus bringing the system to the state labelled 216. As long as the available steam energy exceeds the load requirements, the system will progress from one state to another (e.g., from 216 to 217 to 218 to 219) until the turbine speed drops below some predetermined minimum. If the turbine speed is still high (as sensed by line 153) when state 219 is reached, a command is generated on line 106 to actuate compressor motor 37 as indicated by state 220. When this occurs, the compressor 80 functions to raise the air pressure to a level which is greater than the existing pressure in storage 41 causing poppet valve 42 to open. Excess solar energy is thus stored as compressed air in tank 41 for later use as previously described.

If the enthalpy of the solar generated steam exceeds the load, electrical and compressor motor demand (i.e., turbine speed higher than a predetermined level) steam is vented to the hot well 28 (by a command on line 107) via valve 25 as indicated by the state labelled 221. State 222 is reached only when the turbine speed still exceeds the preestablished minimum under full load with venting to the hot well. The command generated on line 108 causes the mirror 21 to be moved away from the sun, thus reducing the solar input energy available to generate steam.

It will be understood that the action taken in returning from one state to another via a low speed path (i.e., flow paths 224-230 and 210-214) undoes whatever change occurred in reaching that state. Thus, if the system is presently in state 220, and the turbine speed drops below a pre-established minimum, switch 75 will be opened and valve 42 will be closed by a command on line 106, thus returning all components to the state which corresponds the the box labelled 219. It will also be understood that the path 215 indicates that the system will immediately transfer to the corresponding sufficient steam state whenever sufficient steam becomes available at a time when the turbine 30 is being driven by air. This is accomplished by simultaneously opening valves 26 and 70 and closing valves 44 and 84 via command lines 105 and 101 respectively.

In summary, the Energy Management System 100 extracts maximum energy from any available steam by automatically coupling in higher loads to control turbine speed. Battery energy is always replenished first. The system will also supply loads without air or steam (state 200) to the limit of its batteries.

Figure 4:
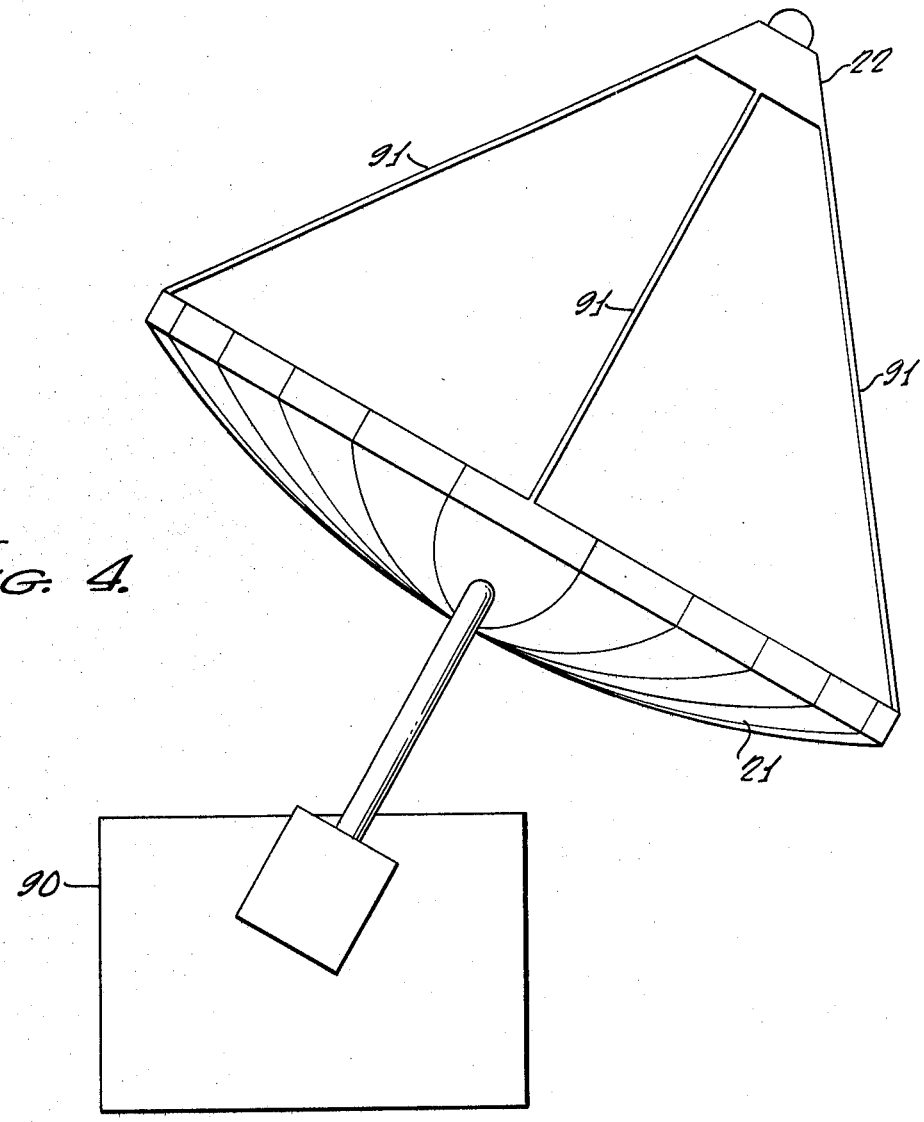
FIG. 4 shows a side elevation of the mirror and heat exchanger positioned at the focal point of the mirror.
Figure 5:
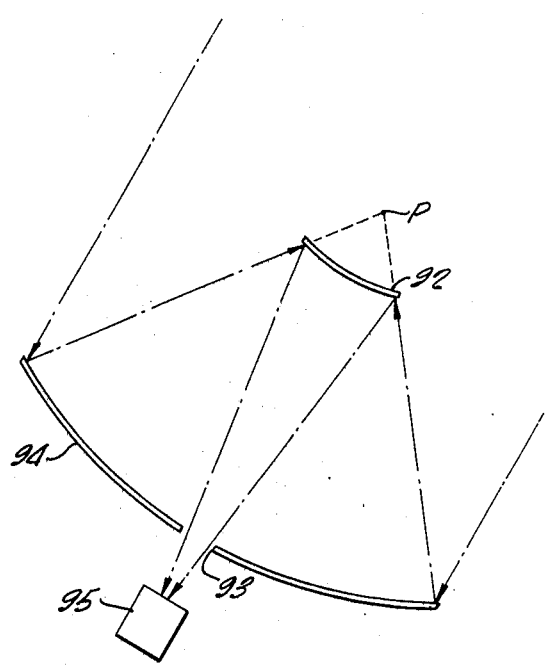
FIG. 5 shows an alternative embodiment utilizing a Cassegranian mounting for the heat exchanger.

FIGS. 4 and 5 illustrate two possible alternatives for positioning the converter 22. In FIG. 4, the converter 22 is located at the focal point of the mirror 21, and the fluid is channelled to the converter by one or more hollow pipes 91 which also form the structural support for the converter 22. In the cassegranian mounting shown in FIG. 5, a small convex hyperboloidal mirror 92 intercepts the rays preceeding toward the focal point "P," and reflects them back through an opening 93 in the center of the parobolic collecting mirror 94 to the converter 95. Each system has certain advantages and disadvantages, which will be considered in connection with the description of the novel converters given hereinbelow.

Figure 6:
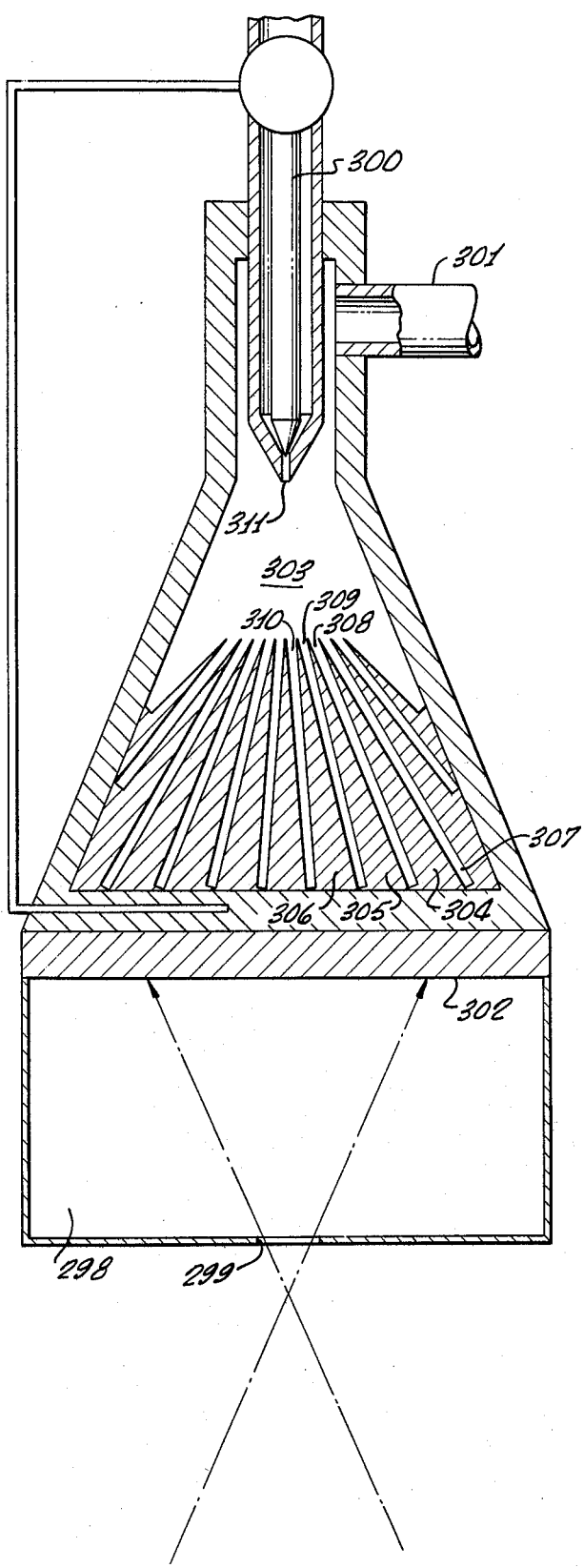
FIG. 6 shows a cross-sectional view of a multiple pyramidal surface heat exchanger.

FIG. 6 shows a preferred embodiment of a flash converter which can be used with either type of mounting described above. The operative elements include an entrapping converter 299, an injection nozzle 300, an outlet orifice 301, an absorption plate 302, and an inner chamber 303 which comprises a plurality of pyramidal structures (e.g., 307, 308, 309 and 310) in two orthogonal planes. Thermal energy is directed into the plate 302 causing the temperature of the inner chamber 303 to raise to approximately 1500° F. Fluid injected by nozzle 300 through orifice 311 impinges upon the high surface area formed by the pyramids. Any fluid which is not converted to a gas upon the first collision with a surface of a pyramid is reflected to the surface of an adjacent pyramid — the momentum of the fluid and the angle of the surfaces relative to the direction of the inject stream being sufficient to produce an adequate number of collision to effect total conversion of the injected fluid into a vapor.

The function of the entrapping aperature 299 is to allow all the directed energy from the collector 21 into the cavity 298, while at the same time minimizing the amount which escapes through reflection, reradiation or convection. In essence, the radiant energy entering the aperture 299 is partially absorbed when it strikes the surface of the plate 300 and the remainder is diffused within the enclosure 298. The diffused energy continues to be absorbed and reflected around the cavity 298, but only a small amount finds its way out through aperature 299. Hence, the incident energy is trapped — and converted to heat for vaporizing the injected fluid.

FIG. 7 shows an extension of the concept illustrated in FIG. 6, in which two converters are mounted so as to utilize a common solar collector and entrappment cavity 400. The converters each contain a pyramidal flash conversion chamber (401 and 402) which form the head chambers of a two cylinder reciprocating piston engine. By properly phasing the injection times, the engine can be made to run at the desired speed for a given load and thermal input. If the engine is mounted at the Cassigranian focal point, it will function to directly convert solar energy to mechanical energy. Such an apparatus can be used in lieu of the gas turbine previously described.

The Sun Sensor is preferrably a quadrant detector (four photocells in a quadrant arrangement). An X and Y axis servo is utilized to drive the array until all signals are equal (as detected by a conventional differential amplifier). Once the system locates the sun, it will continue to track the sun until interrupted by nightfall or severe overcast.

In order to find the sun to commence tracking, the solar history is recorded in a memory during each day. The last day updates the previous solar path in order that an early "fix" can be established on the next succeeding day. This information thus serves to direct the collector to an approximate position in the sky where the sun should be — thus assuring "lock-in" irrespective of the time at which the sun first appears on an overcast day.

Although the basic concepts involved in the present disclosure have been shown and described using what was termed preferred embodiments, it will be understood that these are exemplary only, and that the invention is not limited thereto. It will also be understood that numerous changes, modifications and substitutions may be made without departing from the spirit of the invention.

We claim:

1. A reflecting solar concentrating collector; converter means for converting an injected liquid into a superheated vapor, said converter means to be positioned at a point so as to receive the reflected solar energy collected by said reflecting solar concentrating collector;

prime mover means operatively coupled to the output of said converter means for converting the energy in the superheated vapor to mechanical energy;

electrical generator means operatively coupled to the output of said prime mover means for converting the mechanical energy developed by said prime mover means to electrical energy; compressed gas storage means for storing energy in the form of a high pressure gas;

valve means for connecting said compressed gas storage means to said prime mover means;

means for connecting a consumer load to said electrical generating means;

means for sensing the output of vapor energy generated by said converter means;

means for sensing the amount of electrical power demanded by a consumer load;

compressor means operatively connected to said compressed gas storage means for compressing gas for storage in said compressed gas storage means;

energy management means operatively connected to monitor said means for sensing the consumer load and said means for sensing the vapor energy, for generating a command to operate said compressor means when the vapor energy exceeds the consumer load by a predetermined amount and for generating a command to open said valve means so as to operate said prime mover means from said compressed gas storage means when the consumer load exceeds energy available from the solar generated vapor;

controller means operatively connected to said compressor means and to the output of said electrical generator means for supplying electrical energy developed by said generator means, as a result of excess vapor energy, to said compressor means whereby the excess vapor energy may be stored in the form of compressed gas.

2. The apparatus recited in claim 1 wherein said prime mover means comprises a turbine.

3. The apparatus recited in claim 1 wherein said prime mover means comprises a reciprocating piston engine having at least one cylindrical head chamber comprising a flash vaporizing converter.

4. The apparatus recited in claim 1 wherein is included:
a hot well;
means for venting excess vapor energy to said hot well so as to raise the temperature of said hot well above the ambient temperature.

5. The apparatus recited in claim 4 including:

heat exchanger means operatively coupled to said hot well for raising the temperature of the compressed gas used to operate said prime mover means.

6. The apparatus recited in claim 1 wherein said converter means comprises:

a housing having an inlet opening and an outlet opening, a fluid injection nozzle mounted within the inlet opening, a vaporizing inner surface located with respect to said nozzle so as to intercept fluid injected by said injection nozzle;

a heat conducting wall having one surface adjacent to, and in tangential contact with a surface of said vaporizing surface;

an entrapment collector formed by one surface of said heat conducting wall and by a second surface having an opening positioned approximately at the focal point of said concentrating collector.

* * * * *